United States Patent [19]

Nozawa et al.

[11] Patent Number: 4,942,900
[45] Date of Patent: Jul. 24, 1990

[54] PRESSURE CONTROL VALVE

[75] Inventors: Yusaku Nozawa, Ibaraki; Kazumasa Yuasa, Tsuchiura; Wataru Ootu; Kinya Takahashi, both of Ibaraki, all of Japan

[73] Assignee: Hitachi Construction Machinery Co., Ltd., Tokyo, Japan

[21] Appl. No.: 412,491

[22] Filed: Sep. 26, 1989

[30] Foreign Application Priority Data

Sep. 28, 1988 [JP] Japan .................. 63-243466

[51] Int. Cl.$^5$ ............................................. G05D 16/00
[52] U.S. Cl. ...................................... 137/490; 137/489; 137/492
[58] Field of Search .............. 137/490, 489, 492, 492.5

[56] References Cited

U.S. PATENT DOCUMENTS

| 2,619,112 | 11/1952 | Renick | 137/490 |
| 3,033,228 | 5/1962 | Mohler | 137/490 |
| 3,683,958 | 8/1972 | Curnow | 137/489 |
| 3,757,811 | 9/1978 | Broker | 137/490 X |
| 3,976,097 | 8/1976 | Brakel | |
| 4,535,809 | 8/1985 | Andersson | |

Primary Examiner—Alan Cohan
Attorney, Agent, or Firm—Fay, Sharpe, Beall, Fagan, Minnich & McKee

[57] ABSTRACT

A pressure control valve has a main valve element of seat type slidably accommodated in a valve case for controlling communication between inlet and outlet sections of the valve case by movement of the main valve element, a control chamber defined within the valve case and between the valve case and an end face of the main valve remote from the outlet section for biasing the main valve element in a valve closing direction, and a variable restriction variable in its opening in response to the movement of the main valve element for communication between the control chamber and the inlet section of the valve case. There are provided first and second pilot lines for communication between the control chamber and the outlet section of the valve case, first and second pilot valve elements arranged respectively in the first and second pilot lines, a first valve drive unit operative in response to the pressure of the inlet section of the valve case for opening the first pilot valve element when the pressure reaches a first predetermined value, and a second valve drive unit operative in response to differential pressure between the pressure of the inlet section of the valve case and signal pressure introduced to a signal port for opening the second pilot valve element when the differential pressure reaches a second predetermined value.

7 Claims, 3 Drawing Sheets

PRESSURE CONTROL VALVE

BACKGROUND OF THE INVENTION

The present invention relates to pressure control valves and, more particularly, to a pressure control valve used in the hydraulic system of construction equipment such as a hydraulic excavator or the like.

Various pressure control valves are used in the hydraulic system of a hydraulic machine such as a hydraulic excavator or the like to protect circuits. For instance, a hydraulic system disclosed in U.S. Pat. No. 3,976,097 comprises a hydraulic circuit in which a hydraulic pump and a plurality of actuators are connected to each other through their respective directional control valves. In the hydraulic circuit, a relief valve and an unload valve are arranged in a delivery line of the hydraulic pump as pressure control means. The relief valve restricts maximum pressure of the delivery line to a value equal to a setting value (relief pressure) of a spring, to protect the circuit. The unload valve is operative in response to differential pressure between the delivery pressure of the hydraulic pump and maximum load pressure of the plurality of actuators. The pump delivery pressure is controlled such tha the differential pressure is retained to a setting value (unload differential pressure) of a spring. Thus, energy loss is reduced.

Conventionally, however, the following problems arise. Specifically, the relief valve and the unload valve are constructed as separate valve elements. If such pressure control valve is used in the hydraulic system, the number of parts of the hydraulic circuit increases, making the circuit arrangement complicated. Thus, the hydraulic system increases in cost.

On a other hand, although not the pressure control valve, U.S. Pat. No. 4,535,809 discloses a flow control valve which consists of a combination of a main valve element of seat type and a pilot valve element. That is, the flow control valve is constructed as follows. Specifically, a control chamber is located at a rearward face of the main valve element of seat type for biasing the main valve element in a valve closing direction. The control chamber communicates with an inlet of the main valve element through a variable restrictor which is variable in opening in response to displacement of the main valve element. The control chamber communicates with an outlet of the main valve element through a pilot passage. A pilot valve element is arranged in the pilot passage. Displacement of the main valve element is proportionally controlled in response to displacement of the pilot valve.

It is an object of the invention to provide a pressure control valve having a combined function of a relied valve and an unload valve with a compact valve construction, and capable of simplifying a circuit arrangement of a hydraulic system.

SUMMARY OF THE INVENTION

For the above purpose, according to the invention, there is provided a pressure control valve comprising:
a valve case having an inlet section and an outlet section for hydraulic fluid as well as a signal port to which signal pressure is introduced;
a main valve element of seat type slidably accommodated in the valve case for controlling communication between the inlet and outlet sections by movement of the main valve element;
a control chamber defined within the valve case and between the valve case and and end face of the main valve elment remote from the outlet section for biasing the main valve element in a valve closing direction;
a variable restrictor variable in its opening in reponse to the movement of the main valve element for communication between the control chamber and the inlet section of the valve case;
a first pilot line for communication between the control chamber and the outlet section of the valve case;
a first pilot valve element arranged in the first pilot line;
first valve drive means, operative in response to pressure of the inlet section of the valve case, for opening the first pilot valve element when the pressure of the inlet section reaches a first predetermined value;
a second pilot line for communication between the control chamber and the outlet section of the valve case;
a second pilot valve element arranged in the second pilot line; and
second valve drive means, operative in response to differential pressure between the pressure of the inlet section of the valve case and the signal pressure introduced to the signal port, for opening the second pilot valve element when the differential pressure reaches a second predetermined value.

In this invention, when the pressure of the inlet section of the valve case increases to a high value so that the first predetermined value is exceeded, the first pilot valve element is so opened that the hydraulic fluid within the control chamber flows toward the outlet section of the valve case through the first pilot line. Accordingly, the main valve element is opened by this flow as pilot flow, and large flow rate passes through the main valve element, so that the pressure of the inlet section of the valve case is retained to the first predetermined value. Further, the differential pressure between the pressure of the inlet section of the valve case and the signal pressure introduced to the signal port increases to a high value. When the differential pressure exceeds the second predetermined value, the second pilot valve element is opened so that the hydraulic fluid within the control chamber flows toward the outlet section of the valve case through the second pilot line. Accordinly, the main valve element is opened by this flow as pilot flow, and large flow rate passes through the main valve element, so that the differential pressure between the inlet section of the valve case and the signal pressure is retained to the second predetermined value.

Because of such operation, the following functions are obtained. Specifically, the inlet section of the valve case is connected to the pump delivery line of the hydraulic system. The outlet section of the valve case is connected to a tank. The signal port is connected to a maximum load line. The first predetermined value serves as a relief pressure, and the second predetermined value serves as an unload differential pressure. The pump delivery pressure is retained to a value equal to or les than the relief pressure by combination of the first pilot valve element and the main valve element, so that the relief valve function is secured. On the other hand, differential pressure betweent the pump delivery pressure and the maximum load pressure is retained to a value equal to or less than the unload differential pressure by combination of the second pilot valve element and the main valve element. Thus, the unload valve function is secured.

Preferably, the first pilot line is a first communication passage which extends through the main valve element. The pilot valve element is a first poppet valve element which is arranged in coaxial relation to the main valve element and which opens and closes an opening of the first communication passage adjacent the outlet section of the valve case. A first valve drive means comprises first spring means for biasing the first poppet valve element in the valve closing direction, for setting the first predetermined value, a first piston arranged coaxially within the main valve element for driving the first poppet valve element in a valve opening direction, and a first pressure chamber communicating with the inlet section of the valve case for causing the pressure of the inlet section of the valve case to act upon a pressure receiving end of the first portion.

Futher, preferably, the second pilot line comprises a second communication passage which extends through the valve case. The second pilot valve element is a second poppet valve element which is arranged in coaxial relation to the main valve element and which opens and closes a portion of the second communication passage which communicates with the control chamber. A second valve drive means comprises second spring means for biasing the second poppet valve element in the valve closing direction for setting the second predetermined value, piston means arranged in coaxial relation to the main valve element for driving the second poppet valve element in the valve opening direction, and pressure chamber means for causing differential pressure between the pressure of the inlet section of the valve case and the signal pressure of the signal port to act upon the piston means.

Moreover, preferably, the piston means includes a second piston arranged coaxially within the main valve element for biasing the second poppet valve element in the valve opening direction, and a third piston arranged coaxially within the valve case for biasing the second poppet valve element in the valve closing direction. The pressure chamber means includes a second pressure chamber communicating with the inlet section of the valve case, for causing the pressure of the inlet section of the valve case to act upon a pressure receiving end of the second piston, and a third pressure chamber communicating with the signal port for causing the signal pressure to act upon a pressure receiving end of the third piston.

Furthermore, preferably, the first and second pressure chambers are part of a common single pressure chamber. The second poppet valve element comprises a projection which extends into the control chamber through the portion of the second communication passage, and a second piston is abutted against the projection when the pressure of the inlet section of the valve case acts.

DETAILED DESCRIPTION OF THE PREFERRED EMBODIMENTS

An embodiment of the invention will be described below with reference to FIGS. 1 through 3.

Figure 1:
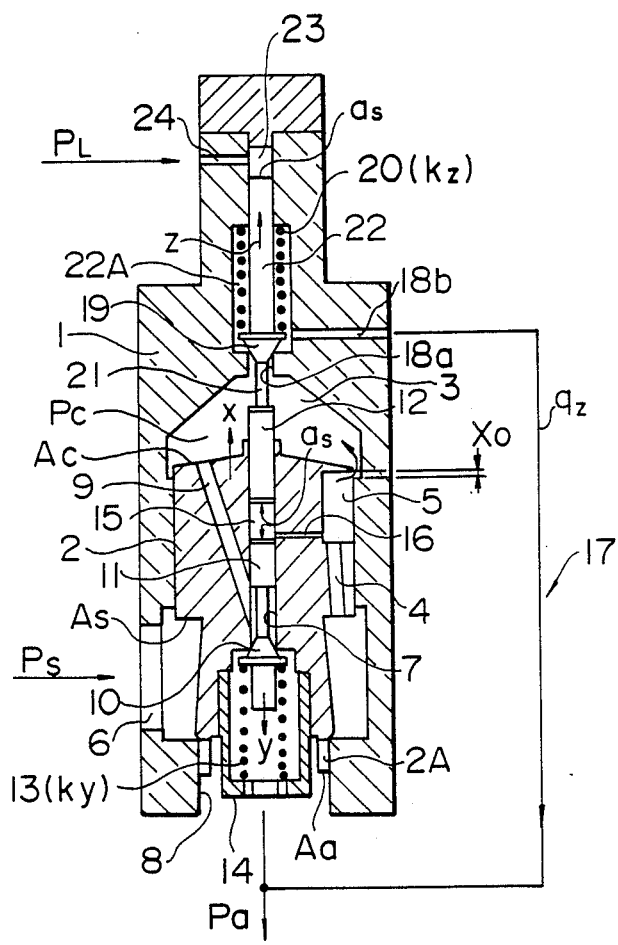
FIG. 1 is a longitudinal cross-sectional view of a pressure control valve according to an embodiment of the invention.

In FIG. 1, a pressure control valve according to the embodiment of the invention comprises a valve case 1 having an inlet section 6 and an outlet section 8 for hydraulic fluid, and a main valve element of seat type of a seat valve element 2 slidabley inserted in the valve case 1. A control chamber 3 for biasing the seat valve element 2 toward a valve closing direction is defined at an end of the seat valve element 2 within the valve case 1, which end is located remote from the outlet section 8. That is, the control chamber 3 is defined by the valve case 1, the seat valve element 2, and a communication bore 4 formed within the seat valve element 2. The control chamber 3 communicates with the inlet section 6 through a variable restrictor 5 which is variable in opening in response to displacement of the seat valve element 2. A main orifice 2A is provided at a portion of the seat valve element 2, which is in sliding contact with the outlet section 8.

Within the seat valve element 2, there is provided a bore 7 extending in coaxial relation to the seat valve element 2, and a first inclined pilot line or a communication bore 9 having one end thereof opening to the control chamber 3 and the other end opening to a portion of the bore 7 adjacent the outlet section 8 for allowing communication between the control chamber 3 and the outlet section 8. A first pilot valve element or a poppet valve element 10 is arranged at the end of the bore 7 adjacent the outlet section 8 for opening and closing an opening of the bore 7. Incorporated in the bore 7 are a piston 11 which contacts the poppet valve element 10 for allowing opening thereof and a piston 12 which is inserted from the end of the seat valve element 2, remote from the outlet section 8, and which has one end projecting from the seat valve element 2. A spring 13 is arranged at an end of the poppet valve element 10 adjacent the outlet section 8 for biasing the poppet valve element 10 in a valve closing direction. The spring 13 is held by a valve retainer 14 which is threadedly engaged with the seat valve element 2. The spring 13 has its biasing force which is adjustable by movement of the threaded engaging section. A common pressure chamber 15 is defined within the bore 7 and between pressure receiving ends of the respective pistons 11 and 12, which are opposite to each other. A communication bore 16 is formed in the seat valve element 2. The communication bore 16 communicates with the inlet section 6 through the communication bore 4 and introduces pressure $P_s$ of the inlet section 6 to the opposite pressure receiving ends of the respective pistons 11 and 12.

On the other hand, a second pilot line 17 is provided separately from the first pilot line 9, for causing the control chamber 3 to communicate with the outlet section 8 of the seat valve element 2. The second pilot line 17 has a pair of communication bores 18a and 18b which are formed in the valve case 1. A second pilot valve element or a poppet valve element 19 is arranged within a chamber 22A between the communication bores 18a and 18b in coaxial relation to the seat valve element 2, for opening and closing the communication bore 18a which opens to the control chamber 3. A spring 20 is disposed within the chamber 22A for biasing the poppet valve element 19 in the valve closing direction. The poppet valve element 19 has a projection 21 which extends toward the control chamber 3 through the communication bore 18a. The projection 21 is capable of being abutted against an end of the piston 12 which projects from the end of the seat valve element 2 remote from the outlet section 8. In this manner, construction is such that the piston 12 and the poppet valve element 19 are not integral with each other, but are abutted against each other as occasion demands. With such construction, the piston 12 and the poppet valve element 19 are easily positioned, making it possible to facilitate the manufactureing of the pressure control valve.

Further, a piston 22 integral with the poppet valve element 19 is arranged on an end of the element 19 remote from the projection 21 in coaxial relation to the main valve element 2. Signal pressure $P_L$ is introduced, through a signal port 24 provided in the valve case 1, into a pressure chamber 23 at which pressure receiving end of the piston 22 is located.

A portion of the seat valve element 2, which faces toward the inlet chamber 6, has a pressure receiving area $A_s$ which receives the pressure $P_s$ at the inlet section 6. A portion of the seat valve element 2, which faces toward the outlet chamber 8, has a pressure receiving area $A_a$ which receives pressure $P_a$ of the outlet section 8. The portion of the seat valve element 2, which is remote from the outlet section 8 has a pressure receiving area $A_c$ which receives pressure $P_c$ of the control chamber 3. Further, the piston 11 has its pressue receiving area $a_s$ which receives the pressure $P_s$ of the inlet section 6. The pistons 12 and 22 have their respective pressure receiving areas $a_s$ which are identical with the pressure receiving area $a_s$ of the piston 11 and which receives respectively the pressure $P_s$ of the inlet section 6 and the signal pressure $P_L$. Moreover, portions of the respective poppet valve elements 10 and 19, which receive the pressure $P_c$ of the control chamber 3, have also the same pressure receiving area $a_s$. The pressure receiving areas $A_s$, $A_a$ and $A_c$ of the seat valve element 2 have the relationship of $A_c - a_s = (A_s - a_s) + A_a$.

The operation of the pressure control valve arranged as above will next be described by way of example in which the pressure control valve is incorporated in a hydraulic system illustrated in FIG. 2.

Figure 2:
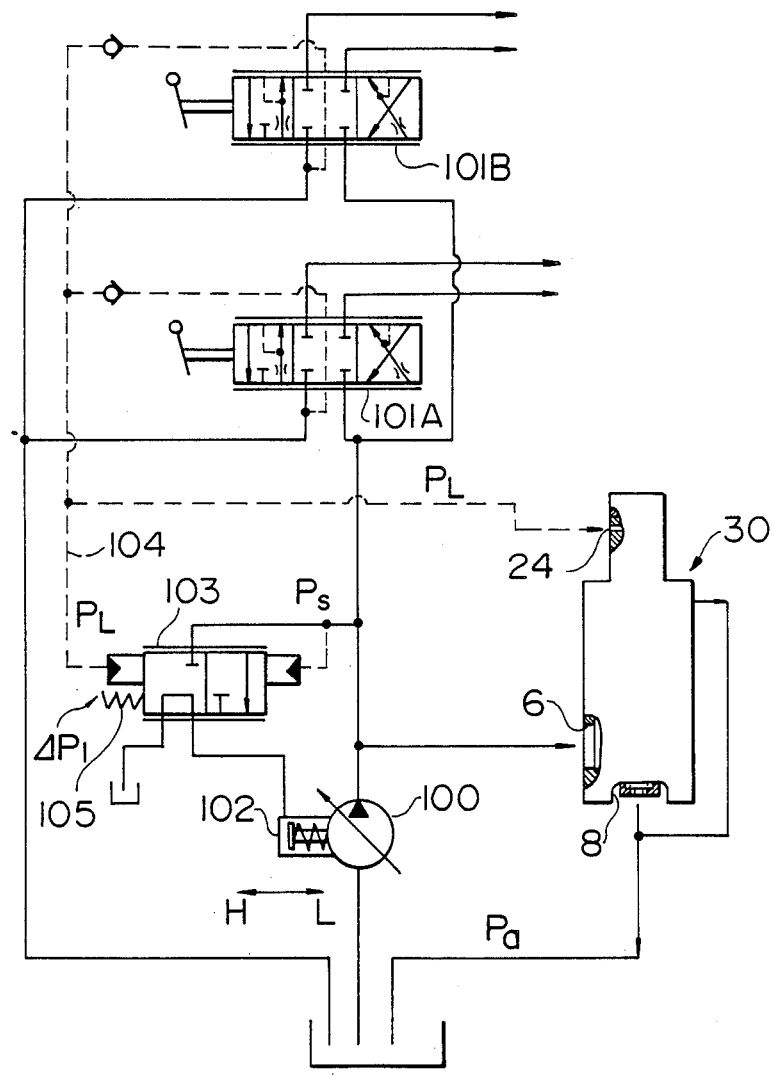
FIG. 2 is a circuit diagram of a hydraulic system which utilizes the pressure control valve.

In FIG. 2, the hydraulic system is of load sensing control. That is, a hydraulic pump 100 of variable displacement type is connected to actuators (not shown) through a pair of directional control valves 101A and 101B of type which is center-blocked at neutral. A valve 103 for control of tilting angle is connected to a cylinder 102 for swash-plate tilting of the hydraulic pump 100. Delivery pressure $P_s$ of the hydraulic pump 100 and maximum load pressure $P_L$ induced through a signal line 104 are introduced respectively into a pair of pilot sections of the valve 103, which are opposite to each other. Differential pressure $P_s - P_L$ across the variable restrictor section of each of the direction control valves 101A and 101B is regulated or adjusted always to a constant value or a load-sensing compensated differential pressure $\Delta P_1$, by a spring 105 provided in the valve 103. At neutral of the directional control valves 101A and 101B, the maximum load pressure $P_L$ is brought to $P_L = 0$ (zero). Accordingly, the valve 103 for control of tilting angle moves to the left in FIG. 2, and the cylinder 102 for swash-plate tilting moves to a direction L. At this time, the cylinder 102 for swash-plate tilting holds or retains the hydraulic pump 100 to its minimum tilting position, and secures a minimum delivery amount such that the pump delivery amount is not brought to 0 (zero) for the purpose of heat radiation of the like.

A pressure control valve 30 according to the embodiment of the invention is arranged at the delivery line of the hydraulic pump 100 for carrying out functions of a relief valve and an unload valve. The inlet section 6 of the pressure control valve 30 is connected to the delivery line of the hydraulic pump 100 so that the delivery pressure of the hydraulic pump 100 is introduced as the pressure $P_s$ of the inlet section 6. The outlet section 8 of the pressure control valve 30 is connected to a tank so that tank pressure is introduced as the pressure $P_a$ of the outlet section 8. The signal port 24 is connected to the signal line 104 so that the maximum load pressure is introduced as the signal pressure $P_L$.

In the hydraulic system constructed as above, the pressure control valve 30 operates as follows. In this connection, description will be made by way of an example in which flow force acting upon the poppet valve elements 10 and 19 and the seat valve element 2 of the pressure control valve 30 can be neglected.

First, with respect to the poppet valve element 19, the pressure of the inlet section 6 or the delivery pressure $P_s$ of the hydraulic pump 100 acts upon the pressure receiving end of the piston 12, and the signal pressure or the maximum load pressure $P_L$ acts upon the pressure receiving end of the piston 22. Accordingly, the equilibrium equation of the hydraulic force of the poppet valve element 19 is expressed as follows, if the spring constant of the spring 20 is $K_2$, the mounting displacement of the spring 20 is $Z_s$, and the displacement of the poppet valve element 19 is Z:

$$a_s(P_s - P_L) = k_z(Z_s + Z) \qquad (1)$$

The above equation (1) is transformed as follows:

$$z = \frac{a_s(P_s - P_L) - k_z \cdot z_s}{k_z}$$

If $f_p = a_s(P_s - P_L)$ and $f_k = k_z \cdot z_s$, the following relationship is obtained;

$$z = \frac{f_p - f_k}{k_z} \qquad (2)$$

Thus, from the equation (1), the poppet valve element 19 is closed during $f_p < f_k$. If the flow rate passing through the communication bores 18 and 17 is $q_z$, $q_z = 0$, and flow cannot be formed at the variable restrictor 5 so that the pressure $P_c$ of the control chamber 3 of the seat valve element 2 is brought equal to the pressure $P_s$ of the inlet section 6. Accordingly, the relationship of the hydraulic force of the seat valve element 2 having the aforesaid pressure receiving area, so that the seat valve element 2 is closed, is as follows:

$$(A_c - a_s)P_c > (A_s - a_s)P_s + A_a \cdot P_a$$

If $f_p > f_k$, the poppet valve element 19 is opened. The opening of the poppet valve element 19 allows hydraulic fluid to flow out of the control chamber 3, thus lowering the pressure $P_c$ in the control chamber 3. The variable restrictor 5, however, underlaps by $X_o$ under the valve closing condition of the seat valve element 2. Therefore, even if the poppet valve element 19 is opened, the seat valve element 2 is not caused to open immediately. But, when the opening of the poppet valve element 19 increases and the presssure $P_c$ of the control chamber 3 decreases to a level which satisfies the following equation, the seat valve element 2 is opened so that large flow rate flows through the seat valve element.

From equilibrium of the hydraulic force of the seat valve element 2:

$$(A_c - a_s)P_c$$
$$= (A_s - a_s)P_s + A_a \cdot P_a$$
$$= (A_s - a_s)P_s + \{(A_c - a_s) - (A_s - a_s)\} P_a$$

If the above equation is transformed, the following relationship is obtained:

$$P_c = \frac{A_s - a_s}{A_c - a_s} P_s + \left(1 - \frac{A_s - a_s}{A_c - a_s}\right) P_a$$

When $K = \frac{A_s - a_s}{A_c - a_s}$, $$P_c = KP_s + (1 - K)P_a$$

In the equation (2), by the way, the magnitude relationship between $f_p$ and $f_k$ is determined by the pump delivery pressure $P_s$ and the maximum load pressure $P_L$ of the hydraulic system, illustrated in FIG. 2, and the spring constant $k_z$ and the mounting deflection $z_s$ of the spring 20 of the pressure control valve 30. Accordingly, when the equivalent pressure of the product $k_z z_s$ of the spring constant $k_z$ and the mounting deflection $z_s$ of the spring 20 is $\Delta P_2$, $k_z$ and $z_s$ are so set that $\Delta P_2$ satisfies $P_s - P_L < \Delta P_2$ that is, $\Delta P_1 < \Delta P_2$ with respect to the differential pressure $P_s - P_L$ at the time of operation of the directional control valves 101A and 101B in which $P_s - P_L$ *is set to a constant value* $\Delta P_1$ by the spring 105 of the valve 103 for contro of tilting angle. By doing so, in equation (2), $f_p < f_k$ is attained when $P_L \neq 0$ at the time of operation of the directional control valves 101A and 101B. Thus, the poppet valve element 19 is closed as described above, and the seat valve element 2 is not opened by the poppet valve element 19. Further, when $P_L = 0$ at the neutral time of the directional control valves 101A and 101B, $f_p < f_k$ is retained in equation (2) during a period in which the delivery pressure $P_s$ of the hydraulic pump 100 is lower than $\Delta P_2$, so that the seat valve element 2 is not opened by the poppet valve element 19. On the other hand, when the delivery pressure $P_s$ of the hydraulic pump 100 increases, $f_p > f_k$ is attained when $P_s > \Delta P_2$, so that the poppet valve element 19 is opened as described above, and the seat valve element 2 is opened. Thus, the flow rate corresponding to the minimum tilting delivery of the pump 100 flows.

Accordingly, by setting $k_z z_s$ of the spring 20 such that $\Delta P_2$ is brought to the unload differential pressure, the pump delivery pressure is retained to the setting pressure at the neutral time of the directional control valve, so that the function of the unload valve is fulfilled.

Next, with reference to the poppet valve element 10, the operation of the poppet valve element 10 is substantially the same as the poppet valve element 9. That is, the pressure $P_s$ of the inlet section 6 is introduced to the pressure receiving area of the piston 11 relating to the poppet valve element 10, and the pressure $P_a$ of the outlet section 8 is introduced to the outlet of the poppet valve element 10. Accordingly, when the spring constant of the spring 13 is $K_y$, the mounting deflection of the spring 13 is $y_s$, and the displacement of the poppet valve 10 is Y, equation (2) can be applied also to the poppet valve element 10 if $P_L = P_a$ and if $k_y$, $y_s$ and y are used in substitution for $k_z$, $z_s$ and z in equations (1) and (2).

Thus, the poppet valve element 10 is maintained closed when $f_p < f_k$, and the seat valve element 2 is also closed. When $f_p > f_k$, the poppet valve element 10 is opened so that the pilot flow is formed through the communication bore 9. Accordingly, the seat valve element 2 is so opened that the large flow rate flows through the seat valve element 2. With reference to the poppet valve element 10, the product $k_y y_s$ of the spring constant $k_y$ and the mounting deflection $y_s$ of the spring 13 is set equivalent to the relief pressure $P_3$. By doing so, the delivery pressure $P_s$ of the hydraulic pump 100 increases when the directional control valves 101A and 101B operate. When the delivery pressure $P_s$ tends to exceed the setting pressure $P_3$, the hydraulic pump 100 is relieved through the seat valve element 2, so that the function of the relief valve is fulfilled.

Figure 3:
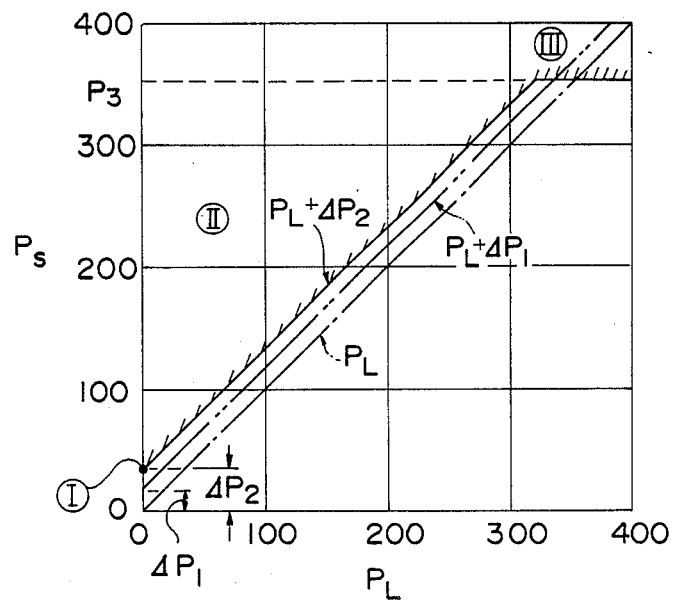
FIG. 3 is a characteristic view showing functions of a relief valve and an unload valve of the pressure control valve in the hydraulic system.

If characteristics of the relief valve function, due to combination of the poppet valve element 10 and the seat valve element 2, and the unload valve function, due to combination of the poppet valve element 19 and the seat valve element 2, in the pressure control valve 30 are plotted, the graphs of FIG. 3 is obtained.

When the directional control valves 101A and 101B are neutral, the minimum delivery amount of the hydraulic pump 100 is secured as described above. Accordingly, the pump delivery pressure $P_s$ is retained to the unload differential pressure $\Delta P_2$ by the unload valve function of the pressure control valve 30. The position of this unload differential pressure $\Delta P_2$ is indicated by the point I in FIG. 3.

When the maximum load pressure $P_L$ is $P_L = 0$ and varies as indicated by the dotted line, the delivery amount of the hydraulic pump 100 is correspondingly load-sensing-controlled by the valves 103 and the cylinder 102, so that the pump delivery pressure $P_s$ is controlled so as to be brought to $P_s = P_L + \Delta P_1$ as indicated by the double dotted line. The operational range of the unload valve of the pressure control valve 30 at this time is represented by II. Specifically, the pump delivery amount becomes excessive transiently. When the pump delivery pressure $P_s$ tends to increase more than the solid line of $P_L + \Delta P_2$, the poppet valve element 19 of the pressure control valve 30 operates so that the unload differential pressure $\Delta P_2$ is secured.

When the pump delivery pressure $P_s$ increases under the high condition of the maximum load pressure $P_L$ so that the pump delivery pressure $P_s$ exceeds the setting pressure $P_s$ of the spring 13 of the pressure control valve 30, the poppet valve element 10 operates so that the hydraulic fluid is relieved to the tank. That is, in FIG. 3, a range III above the line $P_s = P_3$ is the operational range of the pressure control valve 30 as a relief valve.

As described above, according to the embodiment of the invention, the pressure control valve 30 can fulfill a compound function of a relief valve and an unload valve by the use of one seat valve elment 2.

Accordingly, it is possible to obtain a compact construction in which the conventional relief valve and unload valve are brought to one cartridge, and since the seat valve element 2 is used as the main valve element, it is possible to secure high sealing at the time of valve closing similar to the conventional one. Thus, it is possible to simply the circuit arrangement of the hydraulic system without occurring of energy loss. Furthermore, since the poppet valve elements 10 and 19 for the pilot valves, it is possible to further reduce leakage of liquid.

As described above, according to the invention, by the use of one seat valve element, and by addition of the simple construction, it is possible to obtain the pressure control valve which is compact and less in leakage of liquid and which has the compound function of a relief valve and an unload valve. Thus, the circuit arrangement of the hydraulic system can be simplified, and a hydraulic system having a complicated function can be arranged in low cost.

What is claimed is:

1. A pressure control valve comprising:
   a valve case having an inlet section and an outlet section for hydraulic fluid as well as a signal port to which signal pressure is introduced;
   a main valve element of seat type slidably accommodated in said valve case for controlling communication between said inlet and outlet sections by movement of said main valve element;
   a control chamber defined within said valve case and between said valve case and an end face of said main valve element remote from said outlet section for biasing said main valve element in a valve closing direction;
   a variable restrictor variable in its opening in response to the movement of said main valve element for communication between said control chamber and said inlet section of said valve case;
   a first pilot line for communication between said control chamber and said outlet section of said valve case;
   a first pilot valve element arranged in said first pilot line;
   first valve drive means operative in response to pressure of said inlet section of said valve case for opening said first pilot valve element when the pressure of said inlet section reaches a first predetermined value;
   a second pilot line for communication between said control chamber and said outlet section of said valve case:
   a second pilot valve element arranged in said second pilot line; and
   second valve drive means operative in response to differential pressure between the pressure of said inlet section of said valve case and said signal pressure introduced to said signal port for opening said second pilot valve element when said differential pressure reaches a second predetermined value.

2. A pressure control valve according to claim 1, wherein said first pilot line is a first communication passage which extends through said main valve element, said pilot valve element is a first poppet valve element which is arranged in coaxial relation to said main valve element and which opens and closes an opening of said first communication passage adjacent said outlet section of said valve case, and said first valve drive means includes first spring means for biasing said first poppet valve element in the valve closing direction for setting said first predetermined value, a first piston arranged coaxially within said main valve element for driving said first poppet valve element in a valve opening direction, and a first pressure chamber communicating with said inlet section of said valve case for causing the pressure of said inlet section of said valve case to act upon a pressure receiving end of said first piston.

3. A pressure control valve according to claim 1, wherein said second pilot line comprises a second communication passage which extends through said valve case, said second pilot valve element is a second poppet valve element which is arranged in coaxial relation to said main valve element and which opens and closes a portion of said second communication passage which communicates with said control chamber, and said second valve drive means includes second spring means for biasing said second poppet valve element in the valve closing direction for setting said second predetermined value, piston means arranged in coaxial relation to said main valve element for driving said second poppet valve element in the valve opening direction, and pressure chamber means for causing differential pressure between the pressure of said inlet section of said valve case and said signal pressure of said signal port to act upon said piston means.

4. A pressure control valve according to claim 3, wherein said piston means includes a second piston arranged coaxially within said main valve element for biasing said second poppet valve element in the valve opening direction, and a third piston arranged coaxially within said valve case for biasing said second poppet valve element in the valve closing direction, and wherein said pressure chamber means includes a second pressure chamber communicating with said inlet second of said valve case for causing the pressure of said inlet section of said valve case to act upon a pressure receiving end of said second piston, and a third pressure chamber communicating with said signal port for causing said signal pressure to act upon a pressure receiving end of said third piston.

5. A pressure control valve according to claim 4, wherein said first and second pressure chambers are part of a common single pressure chamber.

6. A pressure control valve according to claim 4, wherein said second poppet valve element comprises a projection which extends into said control chamber through the portion of said second communication passage, and wherein said second piston is abutted against said projection when the pressure of said inlet section of said valve case acts.

7. A pressure control valve according to claim 2, wherein said second pilot line comprises a second communication passage which extends through said valve case, wherein said second pilot valve element is a second poppet valve element which is arranged in coaxial relation to said main valve element and which opens and closes a portion of said second communication passage which communicates with said control chamber, and wherein said second valve drive means comprises second spring means for biasing said second poppet valve element in the valve closing direction for setting said second predetermined value, piston means arranged in coaxial relation to said main valve element for driving said second poppet valve element in the valve opening direction, and pressure chamber means for causing differential pressure between the pressure of said inlet section of said valve case and said signal pressure of said signal port to act upon said piston means.

* * * * *